(12) United States Patent
Calvel et al.

(10) Patent No.: US 12,122,070 B2
(45) Date of Patent: Oct. 22, 2024

(54) METHOD FOR PRODUCING A MOLDING ELEMENT HAVING AN AIR DISCHARGE SLOT

(71) Applicant: COMPAGNIE GENERALE DES ETABLISSEMENTS MICHELIN, Clermont-Ferrand (FR)

(72) Inventors: Romain Calvel, Clermont-Ferrand (FR); Michel Lesmarie, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 553 days.

(21) Appl. No.: 17/262,043

(22) PCT Filed: Jul. 10, 2019

(86) PCT No.: PCT/IB2019/055863
§ 371 (c)(1),
(2) Date: Jan. 21, 2021

(87) PCT Pub. No.: WO2020/021369
PCT Pub. Date: Jan. 30, 2020

(65) Prior Publication Data
US 2021/0252747 A1    Aug. 19, 2021

(30) Foreign Application Priority Data
Jul. 21, 2018   (FR) ...................................... 1870848

(51) Int. Cl.
B29C 33/38    (2006.01)
B23K 26/38    (2014.01)
(Continued)

(52) U.S. Cl.
CPC .......... *B29C 33/3842* (2013.01); *B23K 26/38* (2013.01); *B29C 33/10* (2013.01); *B29D 30/0606* (2013.01); *B29D 2030/0617* (2013.01)

(58) Field of Classification Search
CPC ........ B29D 2030/0617; B29D 30/0606; B29C 33/10; B29C 33/3842; B23K 26/38
(Continued)

(56) References Cited

U.S. PATENT DOCUMENTS 6,416,304 B1 * 7/2002 Tanaka .................... B29C 33/10
                                                              425/46
6,443,200 B1 * 9/2002 Lopez ................. B60C 11/1263
                                                              152/DIG. 3
(Continued)

FOREIGN PATENT DOCUMENTS

CN    102744448 A  * 10/2012  ........... B22D 23/003
DE    102014216865 A1 * 2/2016  ............. B29C 33/10
(Continued)

OTHER PUBLICATIONS

International Search Report dated Nov. 11, 2019, in corresponding PCT/IB2019/055863 (4 pages).

*Primary Examiner* — Jimmy Chou
(74) *Attorney, Agent, or Firm* — VENABLE LLP

(57) ABSTRACT

A moulding element (1) intended to be assembled in a mould for a tyre, said moulding element (1) comprising a moulding surface (2), and an external surface (3), venting means (4) designed for venting a flow of air from the moulding surface (2) towards the external surface (3), said venting means (4) comprising a first part (5) opening onto the moulding surface (2) and a second part (6) in communication with the first part (5) and opening onto the external surface (3), the first part (5) forming a path that is closed on itself, is produced by a method comprising the following steps: a step of creating (Continued)

the second part (6) in the moulding element; and a step of creating the first part (5) in the moulding element using a laser.

10 Claims, 1 Drawing Sheet

(51) Int. Cl.
    *B29C 33/10*    (2006.01)
    *B29D 30/06*    (2006.01)

(58) Field of Classification Search
    USPC .................................................. 219/121.72
    See application file for complete search history.

(56) References Cited

U.S. PATENT DOCUMENTS

| | | | | |
|---|---|---|---|---|
| 7,098,423 | B2* | 8/2006 | Masuda | B23K 26/0846 |
| | | | | 219/121.7 |
| 7,118,702 | B2 | 10/2006 | Marchadier et al. | |
| 10,279,429 | B2* | 5/2019 | Gaebelein | B23K 26/389 |
| 2001/0048182 | A1* | 12/2001 | Caretta | B22F 5/007 |
| | | | | 264/501 |
| 2002/0119209 | A1* | 8/2002 | Tanaka | B29D 30/0629 |
| | | | | 425/46 |
| 2003/0218276 | A1* | 11/2003 | Marchadier | B29D 30/0606 |
| | | | | 425/28.1 |
| 2004/0094252 | A1* | 5/2004 | Galimberti | B60C 1/0008 |
| | | | | 156/123 |
| 2010/0000978 | A1* | 1/2010 | Matsumoto | B23K 26/066 |
| | | | | 359/9 |
| 2013/0196014 | A1* | 8/2013 | Enokido | B22C 9/02 |
| | | | | 164/15 |
| 2013/0323342 | A1* | 12/2013 | Kohara | B29C 33/10 |
| | | | | 425/49 |
| 2013/0328240 | A1* | 12/2013 | Takahashi | B60C 11/1218 |
| | | | | 264/293 |
| 2015/0174842 | A1* | 6/2015 | Pialot, Jr. | B29D 30/68 |
| | | | | 264/479 |
| 2016/0001365 | A1* | 1/2016 | Blanchet | B29C 64/40 |
| | | | | 700/97 |
| 2016/0039160 | A1* | 2/2016 | Calvel | B29D 30/0606 |
| | | | | 419/53 |
| 2016/0151988 | A1* | 6/2016 | Gaebelein | B22D 19/0072 |
| | | | | 219/121.72 |
| 2016/0279887 | A1* | 9/2016 | Ciptokusumo | B29C 33/424 |
| 2017/0001340 | A1* | 1/2017 | Koyanagi | B22F 7/06 |
| 2017/0021676 | A1* | 1/2017 | Ichiryu | B60C 11/1376 |
| 2017/0106614 | A1* | 4/2017 | Hiraki | B60C 11/00 |
| 2018/0186110 | A1* | 7/2018 | Koyanagi | B22F 3/115 |
| 2018/0319111 | A1* | 11/2018 | Ishihara | B29C 33/02 |
| 2018/0339430 | A1* | 11/2018 | Hiraki | B29C 35/0255 |
| 2021/0252747 | A1* | 8/2021 | Calvel | B29C 33/3842 |

FOREIGN PATENT DOCUMENTS

| | | |
|---|---|---|
| EP | 1361042 A1 | 11/2003 |
| EP | 3308926 A1 | 4/2018 |

* cited by examiner

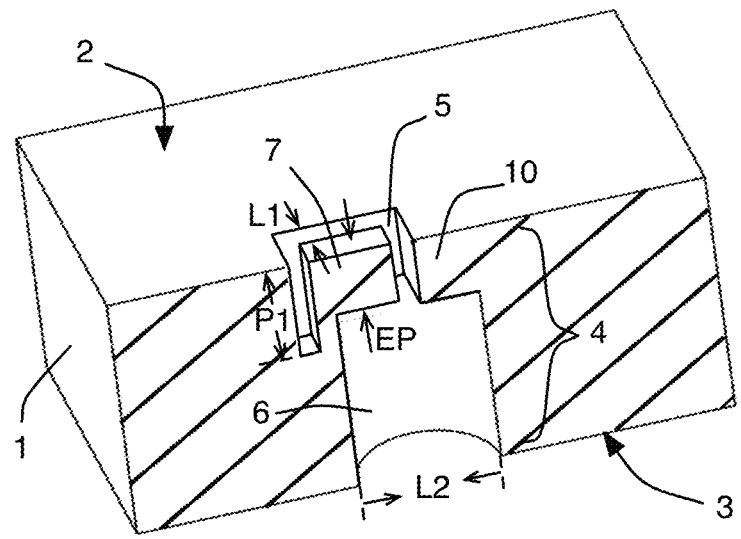
Figure 1
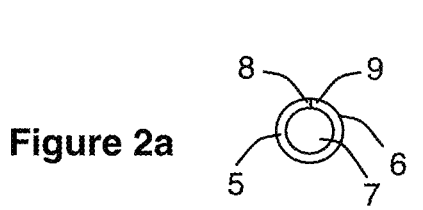
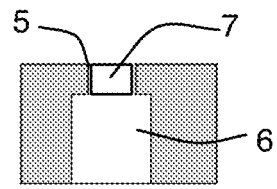
Figure 2a · Figure 2b
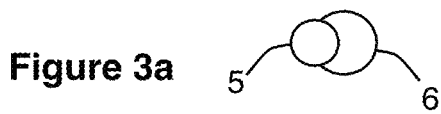
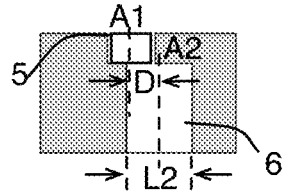
Figure 3a · Figure 3b
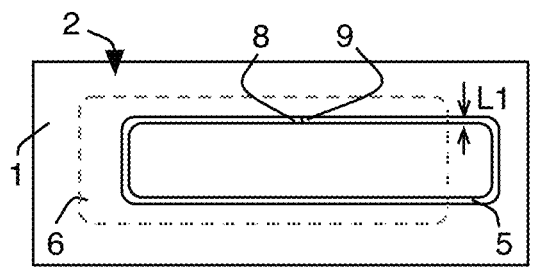
Figure 4a
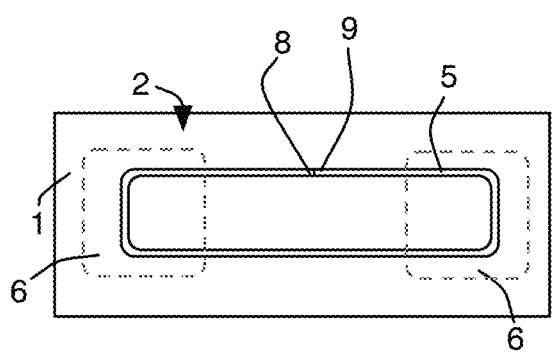
Figure 4b

METHOD FOR PRODUCING A MOLDING ELEMENT HAVING AN AIR DISCHARGE SLOT

TECHNICAL FIELD OF THE INVENTION

The present invention relates to a method for producing a moulding element intended to be assembled in a mould for moulding a tyre, said moulding element comprising a moulding surface designed for moulding a part of the tyre, and an external surface opposite to the moulding surface, venting means suited to discharging a flow of air from the moulding surface towards the external surface, said venting means comprising a first part of width L1 comprised between 0.03 mm and 0.07 mm and of depth P1 less than or equal to 3 mm, said first part opening onto the moulding surface, and a second part in communication with the first part and opening onto the external surface, the width L2 of the second part being comprised between 1 mm and 5 mm and more preferably between 2 mm and 3 mm, the first part forming a path that is closed on itself.

PRIOR ART

During the process of moulding and vulcanizing tyres, the combined effects of the pressure, of the temperature, and of the chemical reactions taking place generate a certain quantity of gas which needs to be released from the mould during moulding. In order to install gas discharge means, industry generally employs a solution that consists in using moulds the outer ring of which has small holes forming a plurality of discharge tunnels distributed about the circumference of the mould. This approach is admittedly effective in allowing the gases to pass, but produces, on the surface of the tread, pips of a shape that corresponds to the profile of the holes, which are formed by the rubber compound, which has a tendency to flow into the vent openings. These pips, which are spread over the periphery of the tread and often over a portion of the sidewalls of the tyre, affect the aesthetic appearance of the end product and persist for as long as the tyre has not covered a certain number of kilometres. In order to avoid the presence of these pips, industry has long been looking for a solution for allowing the air or gas to flow to outside the mould, but without adversely affecting the freshly-moulded product.

Document EP1361042 describes a mould for a tyre comprising a laminated peripheral ring. This ring is made up of a stack, in the circumferential direction, of a plurality of thin sheets. Cuts distributed across a plurality of adjacent sheets increase the mould-venting capability. This approach is effective only for a mould which is formed by laminations.

There is therefore a need for a mould that encourages the discharging of air during the moulding, but without affecting the aesthetic appearance of the moulded tyre.

The invention provides various technical means for remedying these various drawbacks.

SUMMARY OF THE INVENTION

First of all, a first object of the invention is to provide a method for producing a moulding element for moulding the exterior part of the tread of a tyre that allows the air released during the vulcanization phases to be discharged without the formation of pips on the surface of the tread.

Another object of the invention is to provide a method for producing a moulding element for moulding the exterior part of the tread of a tyre that makes it possible to ensure that the venting means produced are indeed functional.

In order to do this, the invention provides a method for producing a moulding element intended to be assembled in a mould for moulding a tyre, said moulding element comprising a moulding surface designed for moulding part of the tyre, and an external surface opposite to the moulding surface, venting means suited to discharging a flow of air from the moulding surface towards the external surface, said venting means comprising a first part of width L1 comprised between 0.03 mm and 0.07 mm and of depth P1 less than or equal to 3 mm, said first part opening onto the moulding surface, and a second part in communication with the first part and opening onto the external surface, the width L2 of the second part being comprised between 1 mm and 5 mm and more preferably between 2 mm and 3 mm, the first part forming a path that is closed on itself, said method comprising the following steps:

i) a step of creating the first part in the moulding element using a laser, said first part having a longitudinal axis A1;

ii) a step of creating the second part in the moulding element, said second part being in communication with said first part, said second part having a longitudinal axis A2; said method being characterized in that:

iii) the step of creating the second part is performed before the step of creating the first part;

iv) steps i and ii being performed in such a way that the axis A2 of the second part (6) and the axis A1 of the first part are spaced apart by an offset D of at least 0.5 mm.

According to one advantageous embodiment, steps i and ii are performed in such a way that the axis A2 of the second part (6) and the axis A1 of the first part are spaced apart by an offset D of at least 1 mm.

This communication between the two parts allows the air that is to be vented to pass between these parts. If the first part were created before the second part, there would be a significant risk of the first part becoming obstructed with debris and dust generated during the creation of the second part, because the free passage of the first part is small in size. The above method makes it possible, by creating the first part after the second part, to avoid the risk of the first part becoming obstructed. In practice, in a moulding element, a plurality of venting means are generally provided. Provision is advantageously made for several second parts to be produced simultaneously, followed by several first parts.

The offset D between the respective axes of the first and second parts makes it possible to ensure that there is always a zone that the two parts have in common. Specifically, because of the fact that the path of the first part is closed on itself, the absence of a zone in common would create a situation in which the central core of the first part would no longer be held in place and would create a large opening.

According to one embodiment, the first part follows a polygonal, circular or oval path.

For example, the first part forms a path in the form of a square, rectangle, a hexagon, triangle, a pentagon, a heptagon, an octagon, a nonagon, a decagon, a hendecagon, a dodecagon, a lozenge, a trapezium, a parallelogram, or any other shape of slot in which the two ends are joined together.

According to one advantageous embodiment, the first part is produced using waterjet-guided laser. A waterjet-guided laser allows a slot of a very narrow width to be made accurately, reliably and economically.

According to another exemplary embodiment, the second part is produced by drilling. Use is made, for example, of a cone drill bit.

As an alternative, the second part is produced using machining. Use is made, for example, of a flat-ended milling cutter.

Advantageously, the first part and the second part are produced using five-axis machines. This type of machine provides a great deal of operational flexibility and allows practically any type of slot profile to be created.

According to various advantageous embodiments, the second part is a cavity or a groove. The first part is advantageously a slot.

Advantageously, the depth P1 of the slot is 0.1 to 1 mm greater than the thickness EP of the wall resulting from the machining operation. This feature provides the operation with a measure of safety to ensure that the first part is deep enough to allow communication with the second part.

DESCRIPTION OF THE FIGURES

All the embodiment details are given in the following description, which is supplemented by FIGS. 1 to 4b, which are given solely by way of non-limiting examples and in which:

FIG. 1 is a perspective view of one embodiment of a moulding element with a venting means;

FIGS. 2a and 2b schematically illustrate one example of an arrangement that is not suitable for creating a venting means;

FIGS. 3a and 3b schematically illustrate one example of an arrangement that is suitable for creating a venting means;

FIGS. 4a and 4b schematically illustrate embodiment variants with various relative dispositions of the first and second part of the venting means.

DETAILED DESCRIPTION OF THE INVENTION

FIG. 1 illustrates an exemplary embodiment of a portion of a moulding element 1 in which a venting means 4 connects a moulding surface 2 and an external surface 3 of said moulding element 1. The venting means comprises a first part 5 and a second part 6 in communication with one another. The first part 5 opens onto the moulding surface 2. The second part 6 opens onto the external surface 3.

As illustrated in FIGS. 3a, 4a and 4b, the two ends 8, 9 of the first part are joined together, forming a path that is closed on itself. The slot of the first part forms a polygonal path, for example in the shape of a square or of a circle (as illustrated in the example of FIG. 3a), an oval, a hexagon, a triangle, a rectangle (as illustrated for example in FIGS. 4a and 4b), a pentagon, a heptagon, an octagon, a nonagon, a decagon, a hendecagon, a dodecagon, a lozenge, a trapezium, a parallelogram, or any other shape in which the two ends 8, 9 are closed on one another.

The first part 5 has a depth P1 which is 0.1 mm to 1 mm greater than the thickness EP of the wall resulting from the machining, as illustrated in FIG. 1. These dimensions make it possible to ensure that the two parts really do communicate with one another.

In this exemplary embodiment, the first part is produced using waterjet-guided laser. The width of the first part 5 is comprised between 0.03 mm and 0.07 mm, and its depth P1 is less than or equal to 3 mm. This depth corresponds to the limit of precision sufficient for creating the first part 5. Beyond 3 mm, the waterjet-guided laser could yield results that are not sufficient to ensure that the first part is produced under optimal conditions.

The width L2 of the second part 6 is between 1 mm and 5 mm, and more preferably between 2 mm and 3 mm.

The method for producing the moulding element 1 comprises the following steps, performed successively in the following order:

a) production of the second part 6 in the moulding element, b) production of the first part 5 in the moulding element using a laser, so that the first part 5 and the second part 6 are in communication.

The first part 5 is produced after the second part 6 so as to prevent any machining or cutting chips or scrap from obstructing the first part if the latter were produced before the second part. Conversely, the chips of material resulting from the creation of the first part 5 after the second part 6 do not carry the risk of blocking said second part 6 given its large dimensions in comparison with the first part 5. Steps a and b are formed in such a way that the respective longitudinal axes A1 and A2 of the first part 5 and of the second part 6 are spaced apart by an offset D of at least 0.5 mm, preferably 1 mm. This offset D between the two parts makes it possible to avoid situations like the one illustrated in FIG. 2a in which the two parts are aligned. In such situations, the first part 5 is entirely released, without any contact with the rest of the moulding element. This situation, which does not conform, leads to a manufacturing defect.

The second part 6 is produced by drilling, using a cone drill bit for example. In a variant, the second part 6 is produced by machining, using a flat-ended milling cutter for example, and/or on a five-axis machine. In the exemplary embodiments, the second part 6 is a cavity, as illustrated in FIGS. 1 to 3b. In a variant, the second part 6 is a groove, as illustrated in FIGS. 4a and 4b.

In FIGS. 1 to 4b, the first part 5 is a slot forming a path the two ends 8 and 9 of which meet.

FIGS. 3a and 3b illustrate an exemplary embodiment of the slot with respect to the drilling of the second part 6. As illustrated, the second part 6 is axially offset with respect to the first part 5. The two parts may be offset by greater or lesser amounts, provided that at least a zone of each of the two parts 5 and 6 is in contact one with the other, ensuring that the first part is held in place.

FIGS. 4a and 4b illustrate exemplary embodiments of the first part 5 in the shape of a rectangle. In FIG. 4a, the first part 5 is axially offset slightly with respect to the second part and this second part 6 is in the form of a groove 6. One single first part 5 communicates with one single second part 6. In a variant, in the example of FIG. 4b, the first part 5 is in communication with two distinct second parts 6

REFERENCE NUMERALS EMPLOYED IN THE FIGURES

| | |
|---|---|
| 1 | Moulding element |
| 2 | Moulding surface |
| 3 | External surface |
| 4 | Venting means |
| 5 | First part |
| 6 | Second part |
| 7 | Central core of the first part |
| 8 | First end |
| 9 | Second end |
| 10 | Wall resulting from the machining |

The invention claimed is:

1. A method for producing a molding element intended to be assembled in a mold for molding a tire, the molding element comprising a molding surface designed for molding part of the tire, an external surface opposite to the molding surface, venting means suited to discharging a flow of air from the molding surface toward the external surface, the venting means comprising a first part of width L1 between 0.03 mm and 0.07 mm and of depth P1 less than or equal to 3 mm, the first part opening onto the molding surface, and a second part in communication with the first part and opening onto the external surface, a width L2 of the second part being between 1 mm and 5 mm, the first part forming a path that is closed on itself, the method comprising the steps:
   (i) creating the first part in the molding element using a laser, the first part having a longitudinal axis A1; and
   (ii) creating the second part in the molding element, the second part being in communication with the first part, and the second part having a longitudinal axis A2,
   wherein the first part and the second part are in communication in a direction that is parallel to the longitudinal axes A1 and A2,
   wherein the step of creating the second part is performed before the step of creating the first part, and
   wherein steps (i) and (ii) are performed in such a way that the axis A2 of the second part and the axis A1 of the first part are spaced apart in a direction that is perpendicular to both axis A1 and axis A2 by an offset D of at least 0.5 mm.

2. The method according to claim 1, wherein steps (i) and (ii) are performed in such a way that the axis A2 of the second part and the axis A1 of the first part are spaced apart by an offset D of at least 1 mm.

3. The method according to claim 1, wherein the first part forms a polygonal, circular or oval path.

4. The method according to claim 1, wherein the first part is produced by waterjet-guided laser.

5. The method according to claim 1, wherein the second part is produced by drilling or by machining.

6. The method according to claim 5, wherein the first part and the second part are produced on five-axis machines.

7. The method according to claim 1, wherein the second part is a cavity.

8. The method according to claim 1, wherein the second part is a groove.

9. The method according to claim 1, wherein the first part is a slot.

10. The method according to claim 9, wherein the depth P1 of the slot is 0.1 to 1 mm greater than a thickness EP of a wall resulting from a machining operation.

* * * * *